United States Patent
Bär et al.

(10) Patent No.: US 7,698,177 B2
(45) Date of Patent: Apr. 13, 2010

(54) DEVICE FOR DISPLAYING A CURRENT STATUS DURING ORDER PROCESSING IN A PRODUCTION PLANT

(75) Inventors: Harald Bär, Hemhofen (DE); Günther Deeg, Erlangen (DE); Günther Domauer, Hetzles (DE); Martina Gottwald, Erlangen (DE); Jürgen Reinhardt, Aurachtal (DE); Roland Wentorf, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1377 days.

(21) Appl. No.: 10/969,702

(22) Filed: Oct. 20, 2004

(65) Prior Publication Data
US 2005/0086134 A1   Apr. 21, 2005

(30) Foreign Application Priority Data
Oct. 20, 2003   (DE)   ................ 103 48 607

(51) Int. Cl.
*G06Q 10/00*   (2006.01)
(52) U.S. Cl. .................................. 705/28
(58) Field of Classification Search ............. 705/1, 705/28
See application file for complete search history.

(56) References Cited

U.S. PATENT DOCUMENTS

| | | | | |
|---|---|---|---|---|
| 5,083,462 A * | 1/1992 | Vermeiren et al. | ............ | 73/587 |
| 5,867,387 A * | 2/1999 | Kavana | ............ | 700/97 |
| 6,073,055 A * | 6/2000 | Jahn et al. | ............ | 700/97 |
| 6,088,626 A * | 7/2000 | Lilly et al. | ............ | 700/100 |
| 6,330,487 B1 * | 12/2001 | Jahn et al. | ............ | 700/97 |
| 6,801,820 B1 * | 10/2004 | Lilly et al. | ............ | 700/100 |
| 6,947,903 B1 * | 9/2005 | Perry | ............ | 705/28 |
| 7,426,701 B2 * | 9/2008 | Strausbaugh et al. | ......... | 715/835 |
| 2002/0010519 A1 | 1/2002 | Watanabe et al. | | |
| 2002/0010661 A1 * | 1/2002 | Waddington et al. | .......... | 705/28 |
| 2002/0054101 A1 | 5/2002 | Beatty | | |
| 2003/0204453 A1 * | 10/2003 | Kawamata | .......... | 705/28 |

OTHER PUBLICATIONS

Brambert, David G.. "Critical New Dimensions: Pressroom Controls And Profits." American Printer Nov. 1, 1987: ABI/INFORM Global, ProQuest. Web. Nov. 30, 2009.*

* cited by examiner

*Primary Examiner*—Matthew S Gart
*Assistant Examiner*—Oluseye Iwarere

(57) ABSTRACT

The present invention relates to a device for displaying current status during order processing in a production plant, with an inter-face (1) to a data processing system (5), from which up-to-date in-formation is obtained about order processing in the production plant, a processing unit (2) for processing the up-to-date information from the data processing system (5) relating to at least one process selected by an operator in graphic form, whereby processing in graphic form includes the graphic display of the allocation of material supply areas for the source process, the allocation of production areas for the make process and essential information for packaging and delivery for the deliver process, and an output unit (3) to output up-to-date information relating to the selected process in the graphic display on one or a plurality of monitors (4). The present device allows employees to have a fast and clear overview of the current status of order processing without additional training.

8 Claims, 6 Drawing Sheets

FIG 3

000
DEVICE FOR DISPLAYING A CURRENT STATUS DURING ORDER PROCESSING IN A PRODUCTION PLANT

CROSS REFERENCE TO RELATED APPLICATIONS

This application claims priority to the German application No. 10348607.0, filed Oct. 20, 2003 and which is incorporated by reference herein in its entirety.

FIELD OF INVENTION

The present invention relates to a device for displaying current status during order processing in a production plant, which is particularly advantageous for logistics departments.

BACKGROUND OF INVENTION

It is very important for a logistics department in a company to display the logistics processes for source, make and deliver in a transparent and clear manner for all its employees, to simplify their work. This relates in particular to information about order planning, requisition of production materials, supply of production materials with location data, allocation of production areas, past and present process malfunctions, delivery of finished parts to packaging with type of packaging and loading date and arrival date with the customer. The information should be accessible to all employees at all times and should be easy to request and easy to understand.

Different planning tools have been available on the market to date, which can be used for resource planning, but the inventors do not know of any device, which displays important information for employees in a clear and easily understandable manner.

U.S. 2002/0010519 A1 relates to a device for displaying the current status during order processing in a production plant, with which the information is displayed to employees on a large-scale display. This is to ensure that all the employees working in an area can obtain the information they require, which may also contain instructions for subsequent activities, at any time. This information is thereby displayed as a function of the respective area in which the display is located. A tabular overview of information relating to the current status of order processing is displayed on the monitor with this device. The device also offers th e option of specifically requesting a graphic overview in the form of a line or bar chart, providing an up-to-date summary of production status.

SUMMARY OF INVENTION

U.S. 2002/0054101 A1 describes a control system for monitoring, con-trolling and reporting in a plant, for example a production plant, in the form of a graphic user interface. This graphic user interface provides different menu levels, some of which provide an overview of the physical arrangement of the individual units or elements of the plant and others of which provide information about the organizational structure of the plant. The individual units of the plant can thereby be displayed in the physical layout as color-coded areas, whereby the color-coding reflects the current status of the respective unit, e.g. a machine. The last-mentioned control system offers a plurality of options but does not allow a fast overview of the processing of an order because it is object-related or element-related.

An object of the present invention is therefore to specify a device for displaying current status during order processing in a production plant, which allows a clear display of the source, make and de-liver processes for all employees. In particular the operation and display functions should be easily understandable for employees even without training.

The object is achieved by the claims. Advantageous embodiments of the device are set out in the dependant claims or will emerge from the description below and the exemplary embodiments.

The present device comprises an interface to a data processing sys-tem, from which up-to-date information is obtained about order processing in the production plant, comprising at least the source, make and deliver processes. Such a data processing system is available in many plants and the corresponding data is input into it and continuously updated by employees and to some extent also automatically. The device also comprises a processing unit for processing the up-to-date information from the data processing system relating to at least one process selected by an operator in graphic form, whereby processing in graphic form includes the graphic display of the allocation of material supply areas for the source process, the graphic display of the allocation of production areas for the make process and the graphic display of essential information for packaging and delivery for the deliver process. Material supply and production areas here refer to the areas provided in the plant, in which the corresponding activities are carried out. The device also comprises an output unit for outputting the processed information supplied by the processing unit relating to the selected process in the corresponding graphic display on one or a plurality of monitors.

Processing the information in graphic form so that a graphic display of the allocation of the material supply areas, the production areas and a graphic display of the essential information for packaging and delivery are available for the operator in one place on a monitor, means that the operator can review the individual processes even without additional training. The option of a direct link via the interface to the data processing system, in which the most up-to-date information is available, means that current status during order processing can be requested and viewed at any time on the monitors linked to the output unit. The monitors are preferably linked to the output unit by means of a local network (intranet) so that access is possible for all employees at any local monitor in th e plant linked via the network. No additional cabling is therefore required, as a LAN connection is generally available in a plant. The purely graphic representation with branching options to deeper levels simply by clicking on the respective area in question—or by touching the area in the case of touch screen monitors—means that the device is extremely simple to operate.

The processing unit is configured such that it supplies the graphic display of the allocation of material supply areas for each order by displaying a chain of defined areas, with the order number(s) input in one area and allocation from the number of material supply areas in another area. The individual chains can be displayed in rows or columns. Information about the current status of material supply in respect of completeness, any defective parts or failure to comply with the time schedule is also provided by color-coding of one or a plurality of the defined areas displayed in the graphic display. This color display makes supply status clear to the operator at first glance.

The processing unit is also configured such that it supplies the graphic display of the allocation of production areas by displaying a number of defined areas, which corresponds to the number of production areas, whereby allocation of the production areas is input by indicating the respective order in the defined areas. This display also allows an immediate overview of the allocation of the available production areas. Information about the current status of production in respect of malfunctions influencing the end of production is provided by color-coding one or a plurality of the areas in the graphic display. The operator can therefore identify possible problems at first glance here too.

In a development of the previous embodiments the processing unit is configured such that the operator can click on the defined surfaces at a graphic user interface, in particular the monitors for displaying information, to generate additional information, in particular order number, target start and target end, actual start and actual end or planned end of production as well as process malfunctions on a new page, which is output by the output unit for display on one or a plurality of monitors. With this configuration the user is able to obtain more detailed information about the individual orders, which cannot otherwise be seen in the single-page graphic display of the process.

The present processing device is also configured such that it pro-vides the graphic display of essential information for packaging and delivery for every order by displaying a chain of defined areas, in which the information is input. This display mode is therefore similar to the one used in one configuration for displaying the allocation of material supply areas. The essential information thereby also contains graphic information about whether additional resources are required for the respective order in order to comply with a pre-defined loading and therefore delivery date. This graphic information is supplied by color-coding one or a plurality of areas so that the operator can see any problems at first glance here too.

In a further embodiment of the present device the processing unit is configured such that it has an additional function for the graphic display of metrics for the individual processes, which can be selected by the operator via the graphic user interface. Such metrics may for example represent the throughput times of all processes within a defined period.

Graphic processing by the processing unit of the information re-quested is preferably achieved by means of a graphic display in an XML or HTML format, so that it can be displayed immediately by means of correspondingly extended programs. The processing unit thereby processes such that the allocation of material supply areas for the source process, the allocation of production areas for the make process and the essential information for the deliver process are all displayed graphically on a single page. Additional information can be requested by clicking appropriately on the area provided in the display, which is then displayed in more detail on a new page.

BRIEF DESCRIPTION OF THE DRAWINGS

The present device is described in further detail below with reference to an exemplary embodiment in conjunction with the drawings, in which:

FIG. 3 shows an example of the graphic display of the make process;

DETAILED DESCRIPTION OF INVENTION

Figure 1:
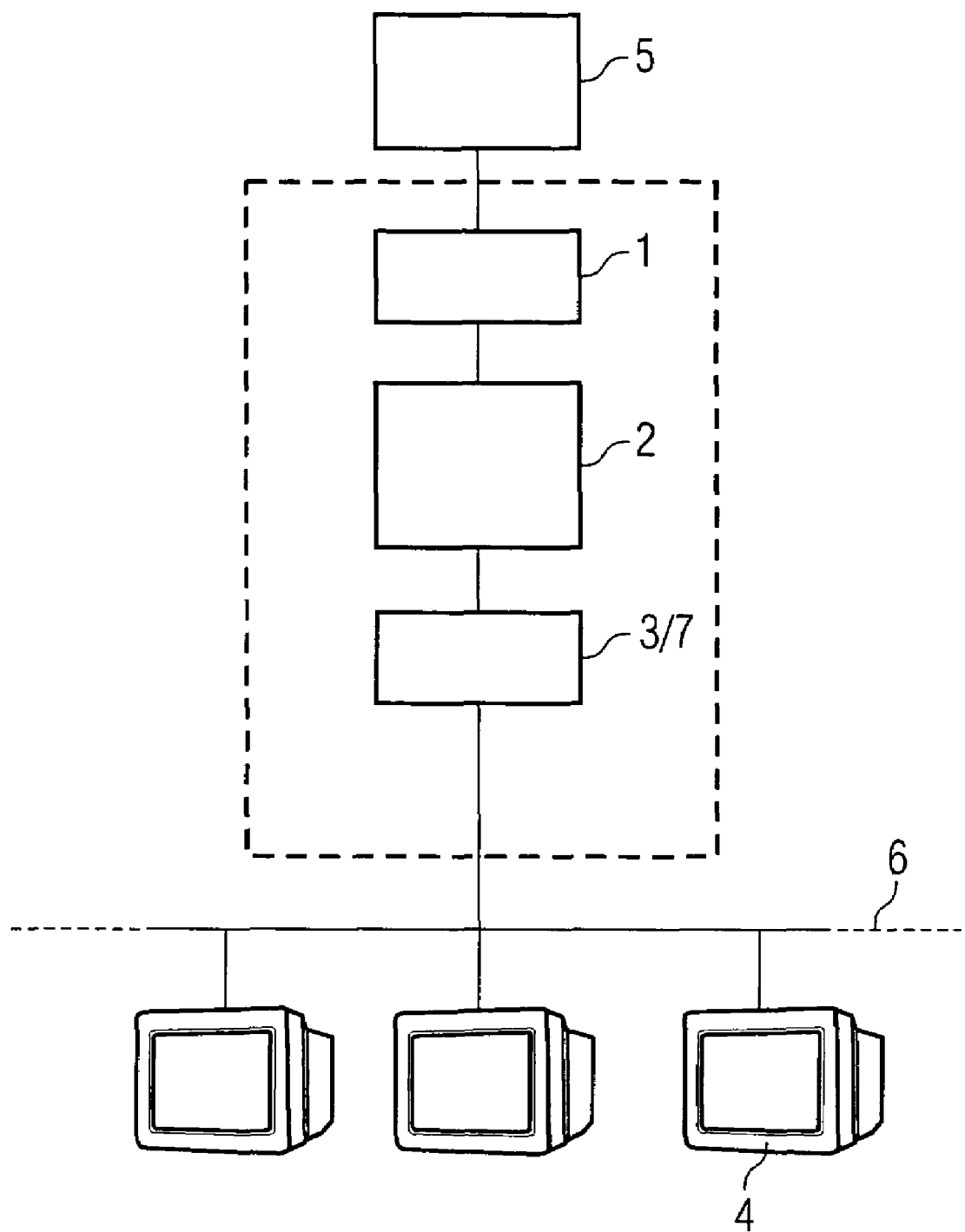
FIG. 1 shows an example of the structure of the present device.

FIG. 1 shows an example of an embodiment of the present invention in schematic form. The device—shown with the broken line—comprises an interface 1 for connection to the data processing system 5 of the production plant. Data relating to logistics is received online via this interface 1 from the data processing system 5. Data processing takes place via the processing unit 2, by means of which an operator can select the corresponding information from a mask via a graphic user interface provided on the monitors 4. The output unit 3 for the graphic display of the data processed graphically by the processing unit 2 is at the same time configured as an input interface 7 for receiving the input at the graphic user interfaces.

New or modified relevant data is sent online from the data processing system 5 via the interface 1 to the processing unit 2 and stored there. If corresponding information is requested by an operator, the data no longer has to be retrieved from the data processing system 5 so a clear time advantage results. The information is then processed graphically, to allow a graphic display of allocation of the material supply areas on one page. The graphic display is output via the output unit 3 on the corresponding monitor 4, at which said data was requested. The graphics displayed are all structured as HTML or XML pages. The operator can use the command areas displayed correspondingly on the page to move to a display of the other make or deliver processes or can even obtain more detailed information about the individual order or source/make/deliver status by clicking on a corresponding area.

Figure 2:
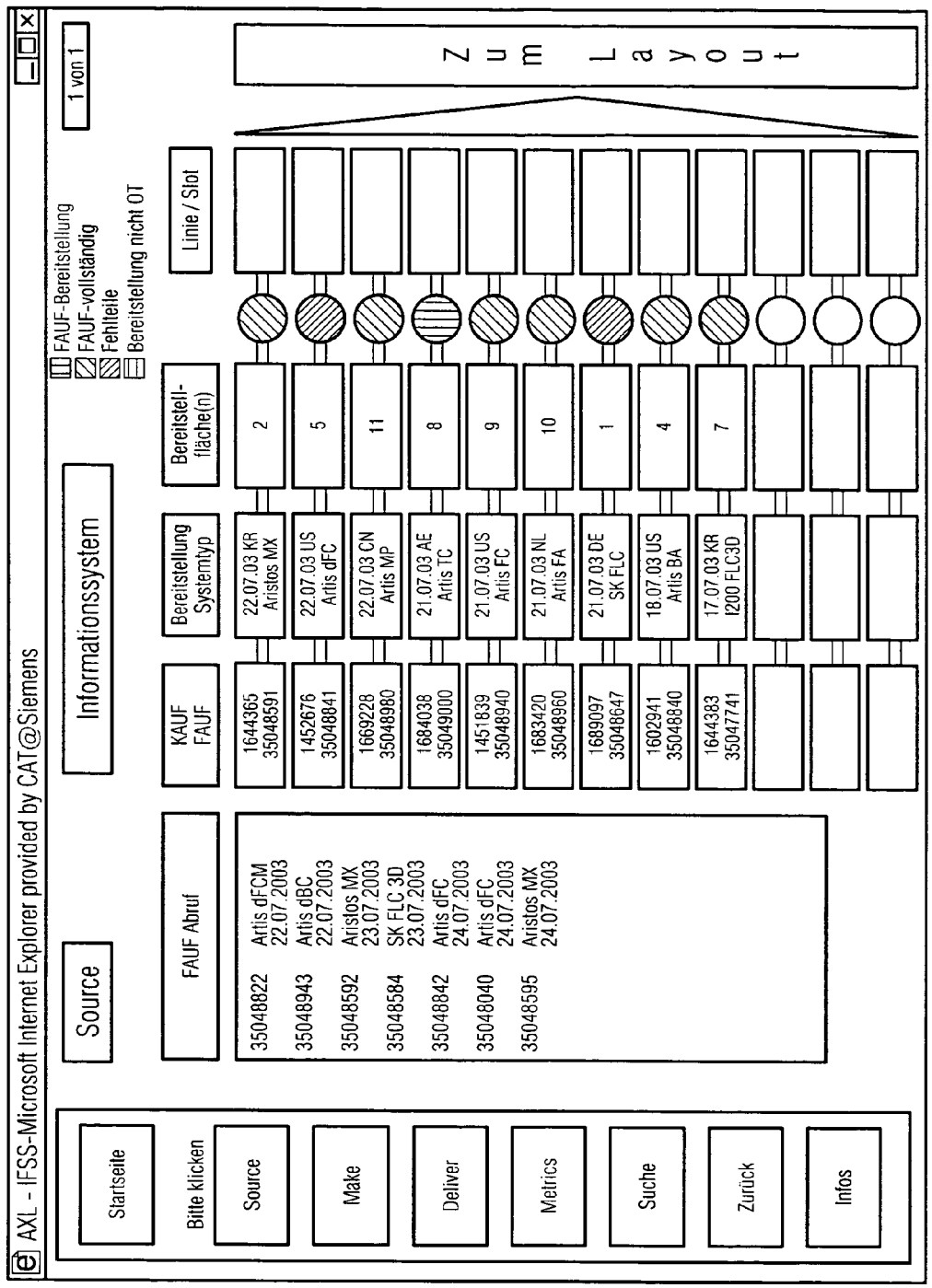
FIG. 2 shows an example of the graphic display of the source process.

FIG. 2 shows an example of the graphic display of the allocation of material supply areas on the corresponding monitor. Command surface are shown on the left of the Figure, which the operator can use to move to a display of other processes—or even a metrics display. On the page shown orders not yet supplied, i.e. the production orders (FAUF) are first listed one below the other on request. Next to these are a plurality of defined areas arranged in a chain, whereby each chain corresponds to a production order or customer order (KAUF). The customer and production order numbers are listed first in the first area in each chain. The next area shows information about the supply date and system type and the adjoining area shows the number of the associated supply area for this order. The next area, configured as round in this example, contains a color-coding, which indicates the current status of preparation of the respective order. Here for example the color-coding distinguishes whether the production order is still in the supply process, whether it has already been supplied in full, whether there are defective parts or whether it fails to com-ply with the predefined time schedule. The color-coding is shown as different types of shading for identification purposes in the pre-sent and subsequent Figures.

Figure 3:
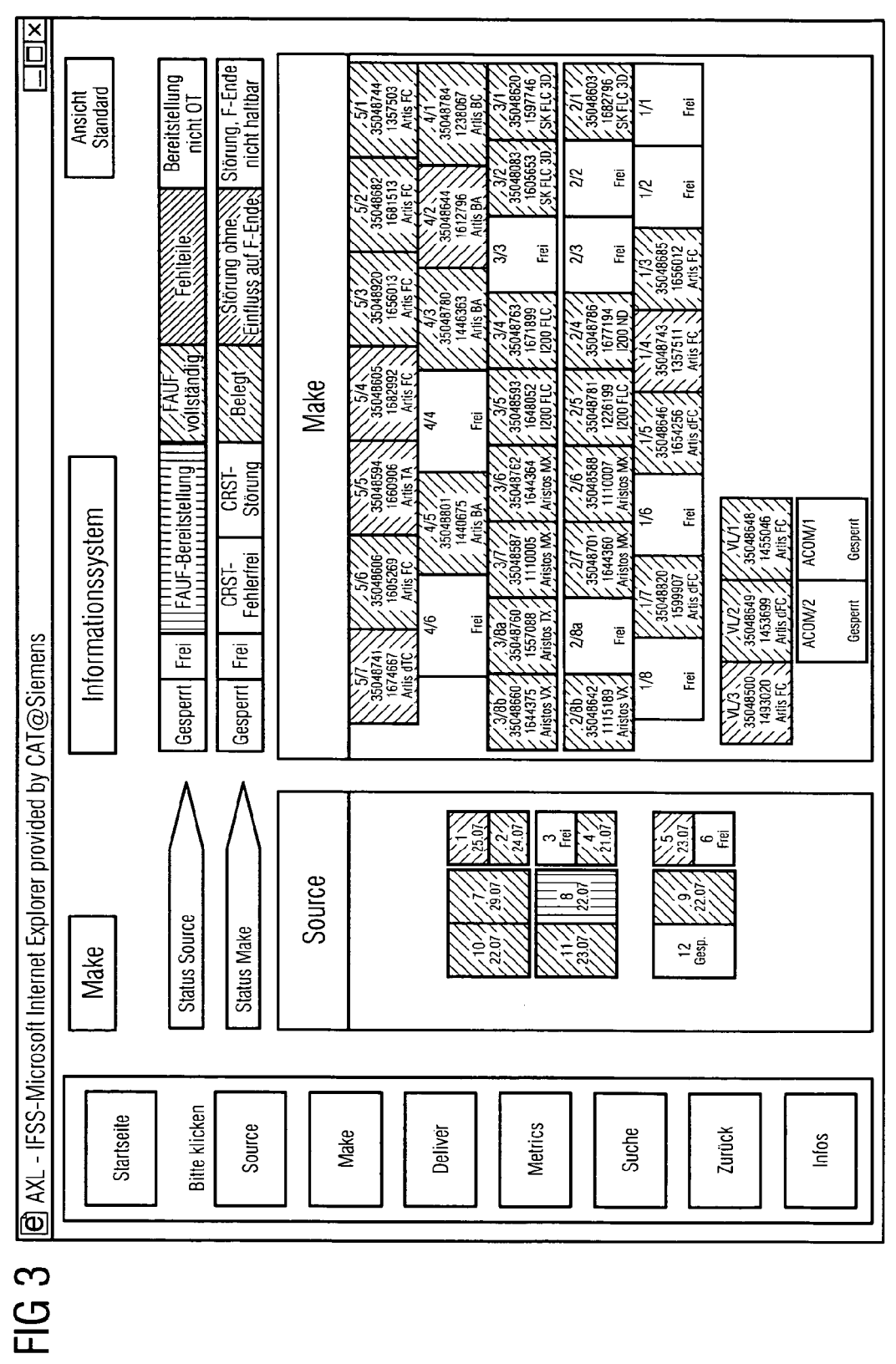
Figure 4:
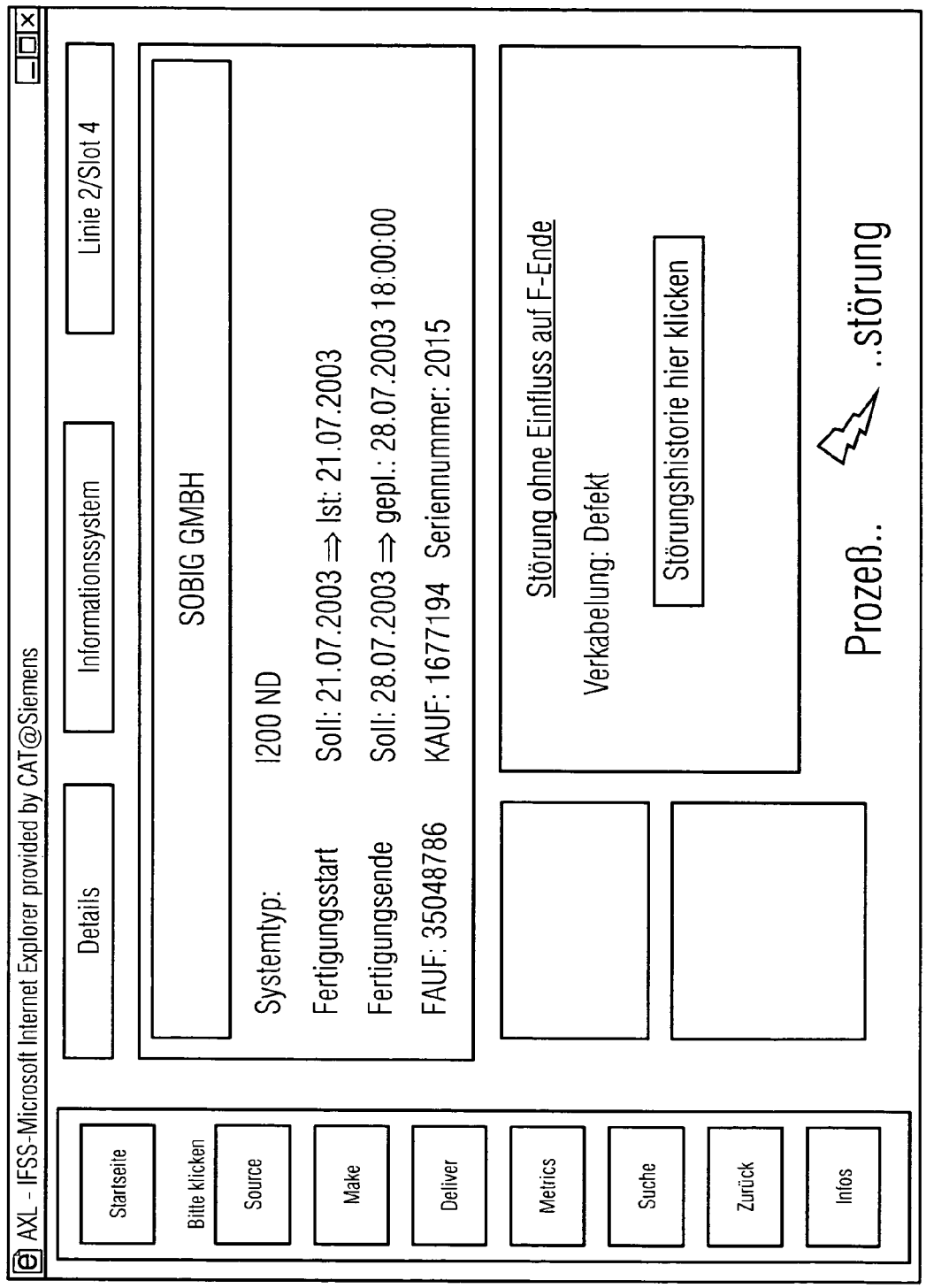
FIG. 4 shows an example of the display of additional information, which can be obtained by clicking on one of the production areas in the display in FIG. 3.

By clicking on the "Make" command area the user can then request in-formation about the production process. FIG. 3 shows an exemplary graphic display of the information processed by the processing unit. In this display next to the command area bar on the left there is also the area relating to orders still at the supply stage, specifying the number of the corresponding supply areas. The display is color-coded such that a distinction can be made between completed supply, ongoing supply, the existence of defective parts, failure to comply with the time schedule or free and blocked supply areas. In the right-hand larger area are the individual defined areas, which represent the production areas. The corresponding order numbers of the associated order are indicated in each of these areas. The areas are thereby color-coded so that it is possible to distinguish between blocked areas, free areas, allocated areas, areas in which a malfunction has occurred without having an influence on the end of production and areas in which a malfunction has occurred with an influence on the end of production. In this way the operator sees the current status of production at first glance. Clicking on one of these defined areas changes the display to a display of the details relating to the corresponding production order, as shown for example in FIG. 4. This display shows details of the associated production order. As well as data relating to the production order, such as customer order number (KAUF), production order number (FAUF), target start, target end, actual start, planned end of production, customer name and country, all the process malfunctions of the corresponding system, e.g. defective parts, errors or failure to comply with the time schedule are also displayed.

Figure 5:
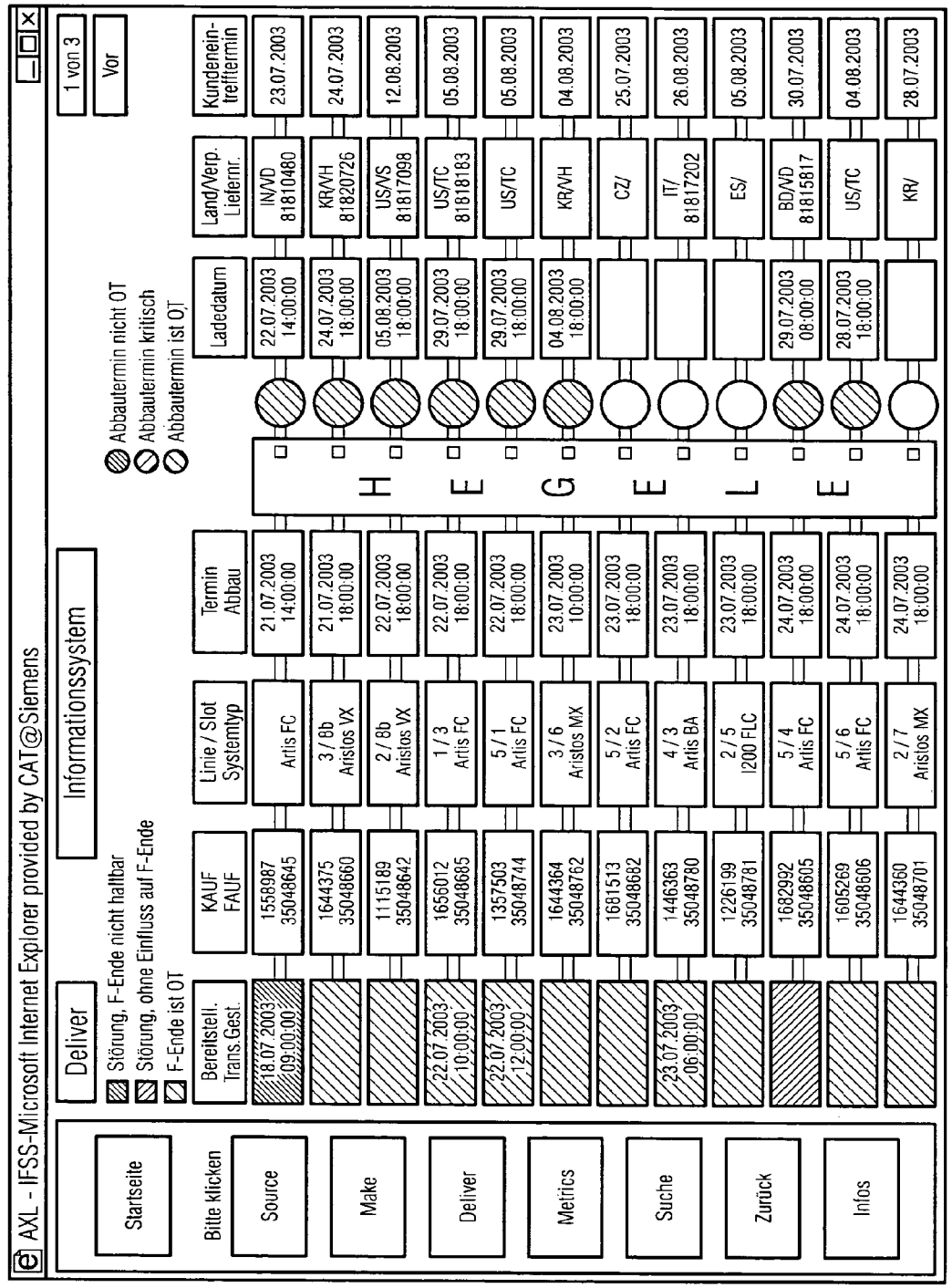
FIG. 5 shows an example of the graphic display of the deliver process.

FIG. 5 finally shows an exemplary graphic display for the deliver process, which for example shows whether standard packaging re-sources are adequate for compliance with the loading time. In this display too color-coding of individual areas is used to distinguish whether a malfunction has occurred such that the end of production is not sustainable, whether a malfunction has occurred without an influence on the end of production or whether the end of production complies with the time schedule. In a further field color-coding shows whether the disassembly time is on schedule, not on schedule or critical. This involves the round fields in the display. Further information, such as the customer order and production order, corresponding disassembly times, loading data and customer dates as well as the country, the packaging and the delivery number are input in the individual fields.

This display also provides a chain of fields for each individual order, as already described in relation to FIG. 2.

Figure 6:
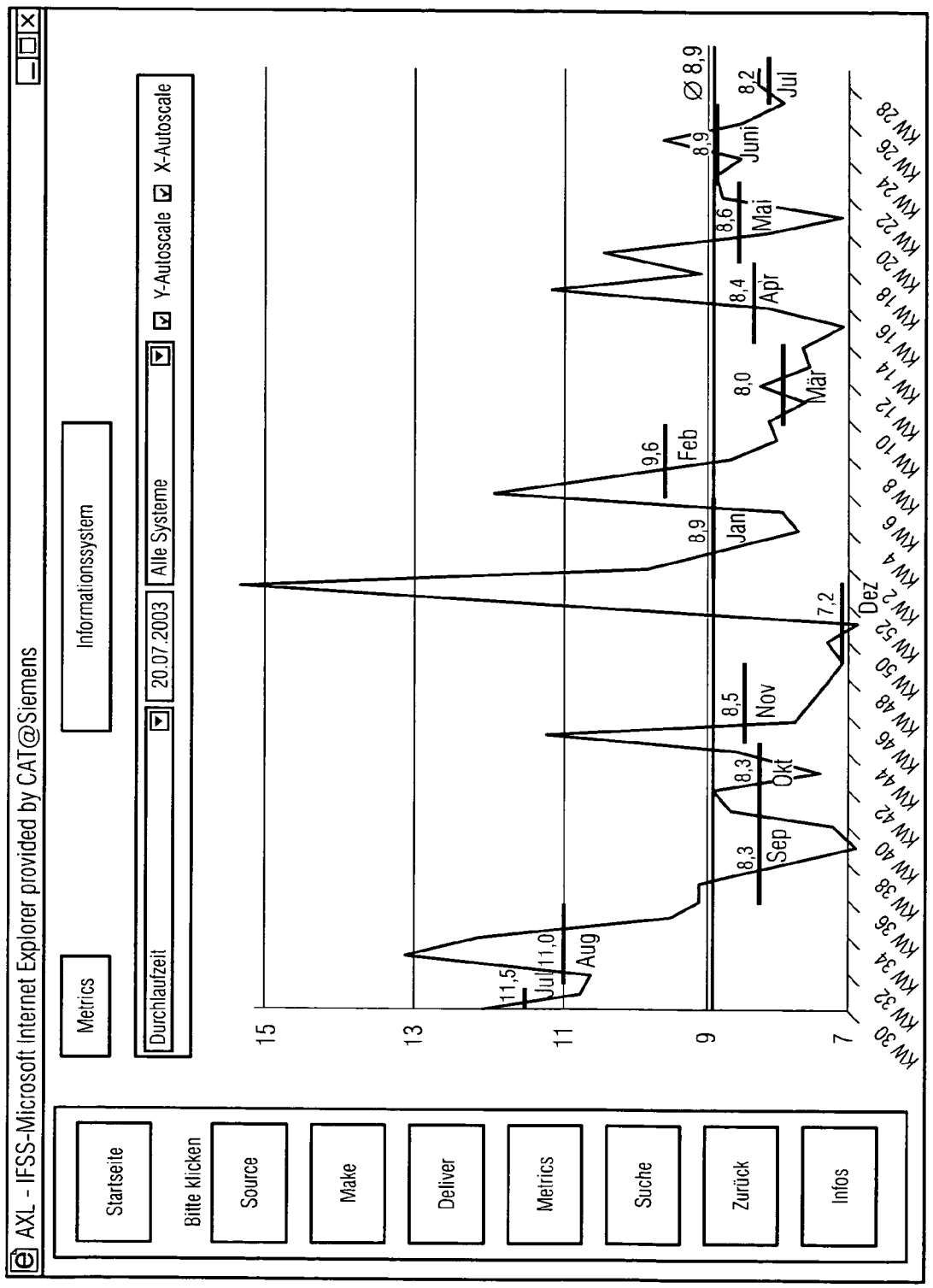
FIG. 6 shows an example of the graphic display of a metric for the processes.

Finally FIG. 6 shows a further exemplary embodiment of a graphic online display of metrics for the respective processes. This Figure shows the throughput times of orders for all systems over a period of 1 year, so that any problem periods and the mean throughput time are clearly shown.

To operate the device at least one monitor can be deployed for example at each production area, said monitor being connected to the de-vice and displaying details of the production order ongoing at the respective production area. The displays on the individual monitors can of course be independent of each other, so that for example the source process can be displayed on one monitor and details of a production order on another monitor. By configuring the monitors as commercially available monitors with touch function and no keyboard or mouse, the specified information, which can be made accessible to all employees at all times via the monitors, can be requested simply and very quickly. The graphic display allows a fast overview of the corresponding process.

The invention claimed is:

1. A device for displaying a current status during order processing in a production plant, comprising:
   an interface to a data processing system for obtaining current information from the data processing system about a source, a make and a deliver process of the production plant;
   a processing unit for processing the current information into a graphic representation selectable by a user, the graphic representation comprising graphic displays of an allocation of a material supply area relevant to the source process, of an allocation of a production area relevant to the make process, and of status information about packing and delivery relevant for the deliver process; and
   an output unit having a screen for displaying the graphic representation selected by the user, wherein
   (a) the graphic display of the allocation of the material supply area relevant to the source process comprises:
      a plurality of orders in the source process wherein each order is graphically represented as a chain of separate screen areas for representing an order number, a supply area and a first color-coded status wherein each order comprises a corresponding order number recorded in a first screen area representing the order number, and the allocation of the material supply area recorded in a second screen area representing the supply area, and status information about a material supply for the material supply area representing the first color-coded status that reflects a current status of each order in the source process with respect to a completeness, defective material components, and a compliance with a time schedule of the source process using a first color code;
   (b) lithe graphic display of the allocation of the production area relevant to the make process comprises:
      a Source window and a Make window, wherein each supply area is graphically represented in the Source window along with its corresponding first color-coded status for orders still in the source process, and wherein each production area is graphically represented in the Make window as a plurality of further separate screen areas corresponding to the number of production areas of the plant, with the allocation of the production area recorded in one of the further separate screen areas by displaying information about a related order, and a second color coded status representing status information about the make process reflecting malfunctions which influence finishing the make process using a second color code; and
   (c) the graphic display of status information about packaging and delivery relevant for the deliver process comprises:
      a plurality of orders in the deliver process wherein each order is graphically represented as a further chain of separate screen areas for representing the order number and a third color-coded status that reflects a current status of each order in the deliver process with respect to disassembly time using a third color code.

2. The device according to claim 1, wherein the processing unit processes and outputs additional user information on a graphic interface including a new screen page of the screen of the output unit upon a user click on at least one area of the chain of separate screen areas, the plurality of further separate screen areas, and the further chain of separate screen areas.

3. The device according to claim 2, wherein the additional information include an element chosen from the group consisting of an order number, a target start time, a target end time, an actual start time, an actual end time, a scheduled end time of the make process and a process malfunction.

4. The device according to claim 1, wherein the processing unit includes a graphic metric display representing a user-selectable metrics related to an element chosen from the group consisting of the source process, the make process and the deliver process.

5. The device according to claim 4, wherein the metrics include a running time of an element chosen from the group consisting of the source process, the make process and the deliver process.

6. The device according to claim 1, wherein the processing generates the graphic representation in XML or HTML format.

7. Device according to claim 1, wherein the output unit is connected to the screen for displaying the graphic representation via a network.

8. The device according to claim 1, wherein the screen for displaying the graphic representation has a touch function for selecting a desired display.

* * * * *